(12) United States Patent
Angel et al.

(10) Patent No.: US 11,731,500 B1
(45) Date of Patent: Aug. 22, 2023

(54) DRIVE PLATE ASSEMBLY FOR HYBRID MODULE

(71) Applicant: Schaeffler Technologies AG & Co. KG, Herzogenaurach (DE)

(72) Inventors: Scott Angel, Marshallville, OH (US); Drew Hilty, Wooster, OH (US); Alfredo Perez Mitre Jimenez, Wooster, OH (US); Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/876,602

(22) Filed: Jul. 29, 2022

(51) Int. Cl.
*B60K 6/40* (2007.10)
*F16H 45/02* (2006.01)
*B60K 6/48* (2007.10)

(52) U.S. Cl.
CPC ........ *B60K 6/40* (2013.01); *B60K 2006/4825* (2013.01); *F16H 2045/0284* (2013.01)

(58) Field of Classification Search
CPC ... B60K 6/38; B60K 6/40; B60K 6/48; B60K 2006/4825
See application file for complete search history.

(56) References Cited

U.S. PATENT DOCUMENTS

| 6,258,001 | B1 * | 7/2001 | Wakuta | B60K 6/48 903/952 |
| 6,628,021 | B2 * | 9/2003 | Shinohara | B60K 6/547 310/68 B |
| 7,017,693 | B2 * | 3/2006 | Omote | B60L 50/16 477/3 |
| 7,753,149 | B2 * | 7/2010 | Tabata | B60K 6/365 180/65.245 |
| 8,020,680 | B2 * | 9/2011 | Degler | F16H 45/02 192/3.29 |
| 9,964,193 | B2 * | 5/2018 | Lindemann | F16H 45/02 |
| 2006/0289209 | A1 * | 12/2006 | Grosspietsch | B60L 50/16 180/65.25 |

* cited by examiner

*Primary Examiner* — Ernesto A Suarez
*Assistant Examiner* — James J Taylor, II

(57) ABSTRACT

A hybrid module includes a rotor carrier. The hybrid module further includes a rotor segment supported by the rotor carrier. The hybrid module further includes a torque converter having an impeller having an impeller shell fixed to the rotor carrier. The impeller shell and the rotor carrier define a housing therebetween. The torque converter further includes a turbine having a turbine shell in fluid communication with the impeller shell. The turbine is disposed within the housing. The hybrid module further includes a drive plate assembly disposed external to the housing. The drive plate assembly includes an inner drive plate fixed to the rotor carrier. The drive plate assembly further includes an outer drive plate fixed to the inner drive plate and configured to receive a torque.

18 Claims, 3 Drawing Sheets

DRIVE PLATE ASSEMBLY FOR HYBRID MODULE

TECHNICAL FIELD

The present disclosure relates generally to a hybrid module, and more specifically to a drive plate assembly for a hybrid module.

BACKGROUND

Hybrid modules are generally known. Often, it is a challenge to package and/or fit all the desired components, e.g., an e-motor, crank damper, torque converter, torque converter clutch, disconnect clutch, and resolver within the hybrid module architecture due to axial and radial constraints. Additionally, it is a challenge to magnetize a rotor segment of the e-motor after assembly of the torque converter due to limited clearance between a drive plate and the rotor segment. Lacking sufficient clearance for a magnetization tool to access the rotor segments may result in insufficient magnetization of the rotor segment, which can reduce performance of the e-motor.

SUMMARY

Embodiments disclosed herein provide a hybrid module comprising a rotor carrier, a rotor segment supported by the rotor carrier, a torque converter, and a drive plate assembly. The torque converter includes an impeller having an impeller shell fixed to the rotor carrier. The impeller shell and the rotor carrier defining a housing therebetween. The torque converter further includes a turbine having a turbine shell in fluid communication with the impeller shell. The turbine being disposed within the housing. The drive plate assembly is disposed external to the housing. The drive plate assembly includes an inner drive plate fixed to the rotor carrier. The drive plate assembly further includes an outer drive plate fixed to the inner drive plate and configured to receive a torque.

In embodiments, the outer drive plate may extend radially outside of an outer surface of the rotor segment. In embodiments, the inner drive plate may be disposed radially inside of the outer surface of the rotor segment. In embodiments, the outer drive plate may be fixed to the inner drive plate radially inside of the outer surface of the rotor segment. In embodiments, the outer drive plate may be fixed to the inner drive plate via a weld. The weld may be located radially inside of the outer surface of the rotor segment.

In embodiments, the outer drive plate may be fixed to the inner drive plate via a connector. The connector may be located radially inside of the outer surface of the rotor segment. The hybrid module may include a flex plate. The outer drive plate may be disposed axially between the rotor segment and the flex plate. The outer drive plate may be fixed to the flex plate radially outside of the connector. The flex plate may include a window radially and circumferentially aligned with the connector. The connector may extend into the window.

In embodiments, the inner drive plate may be fixed to the rotor carrier radially inside of the outer drive plate. In embodiments, the hybrid module may include a stud configured to receive the torque. The stud may be supported by the outer drive plate and disposed at a radially outer end thereof. The outer drive plate may be fixed to the inner drive plate radially inside of the stud.

Embodiments of this disclosure further provide a method of assembling a drive plate assembly in a hybrid module having a rotor carrier, a rotor segment supported by the rotor carrier, and a torque converter. The method includes fixing an inner drive plate of the drive plate assembly to the rotor carrier. The method further includes attaching the rotor segment to the rotor carrier. The method further includes attaching an impeller shell of the torque converter to the rotor carrier. The method further includes, after magnetizing the rotor segment, fixing an outer drive plate of the drive plate assembly to the inner drive plate.

In embodiments, fixing the outer drive plate to the inner drive plate may be carried out via a weld. In embodiments, the inner drive plate may be disposed radially inside of an outer surface of the rotor segment. The outer drive plate may extend radially outside of the outer surface of the rotor segment. In embodiments, fixing the outer drive plate to the inner drive plate may be carried out via a connector. The method may further include aligning a window in a flex plate with the connector. The method may further include fixing the flex plate to the outer drive plate via a stud. In embodiments, the outer drive plate may be fixed to the inner drive plate radially inside of an outer surface of the rotor segment. In embodiments, the method may further include fixing the outer drive plate to a flex plate via a stud.

DETAILED DESCRIPTION

Figure 1:
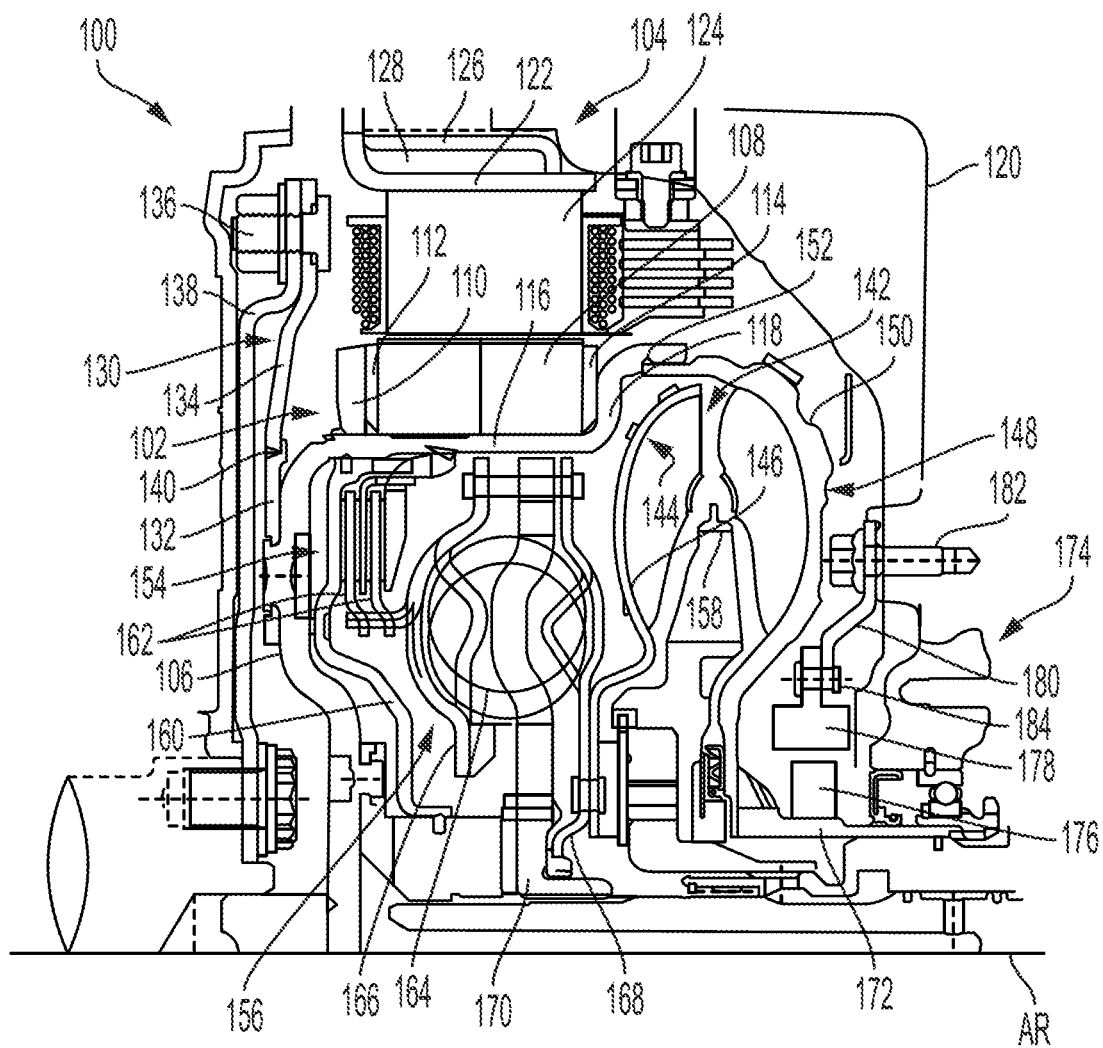
FIG. 1 shows a top half cross-sectional view of a hybrid module including a drive plate assembly according to an embodiment of the present disclosure.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Typically, hybrid vehicles that combine a battery powered e-motor and an automatic transmission driven by a combustion engine will be limited by available space. Hybrid modules include a rotor segment, which requires magnetization, of an e-motor supported by a rotor carrier and a drive plate fixed to the rotor carrier and configured to receive a torque from a flex plate connected to the combustion engine. It is desirable to magnetize the rotor segment after assembly of a torque converter to the rotor carrier in order to reduce risk of contamination of the rotor segment, e.g., via debris that may be attracted to the magnetized rotor segment, and to maintain ease of assembly, e.g., by avoiding introducing magnetic forces from the rotor segment that need to be overcome during assembly of the rotor segment to the hybrid module. Additionally, it is desirable to fix the drive plate to the rotor carrier prior to assembly of a torque converter in order to fix the drive plate to the rotor carrier in a manner, e.g., via a rivet, that prevents fluid leakage through the rotor carrier. Therefore, the drive plate is assembled to the hybrid module prior to magnetization of the rotor segment. The drive plate limits clearance available for a magnetization tool to reach the rotor segment.

Embodiments of the present disclosure provide a hybrid module with a drive plate assembly having an inner drive plate fixed to the rotor carrier and an outer drive plate fixed to the inner drive plate. The two-piece drive plate assembly allows for assembly of the outer drive plate to the inner drive plate after magnetization of the rotor segment, which increases clearance for the magnetization tool to magnetize the rotor segment.

FIG. 1 shows a top-half cross-sectional view of a hybrid module 100 according to an embodiment of the present disclosure. The hybrid module 100 includes a rotor assembly 102 and a stator assembly 104 forming an e-motor assembly. The rotor assembly 102 includes a rotor carrier 106, a rotor segment 108, an end ring 110, a spring end plate 112, and a spring end plate 114. The rotor carrier 106 includes an axially extending portion 116 and a radially extending portion 118. The rotor segment 108 is installed on an outer surface of the axially extending portion 116 of the rotor carrier 106. The rotor segment 108 may be a stack of segments, for example. The spring end plates 112, 114 are assembled on opposite axial sides of the rotor segment 108. That is, the spring end plate 112 is disposed axially between the rotor segment 108 and the end ring 110, and the spring end plate 114 is disposed axially between the rotor segment 108 and the radially extending portion 118. The end ring 110 is configured to compress the spring end plates 112, 114 to clamp and/or secure the rotor segment 108 to the rotor carrier 106 for frictional torque transmission between the rotor segment 108 and the rotor carrier 106. Once the desired compression force is achieved, the end ring 110 is fixed to the rotor carrier 106, e.g., by welding.

The stator assembly 104 is disposed radially outside of the rotor assembly 102 and is fixed to a bell housing 120 for a transmission. The stator assembly 104 includes a stator carrier 122, a stator segment 124, and a water jacket 126. The stator segment 124 may be a stack of stator segments, for example and is mounted on an inner surface of the stator carrier 122 by shrink fitting, for example. In other words, the stator carrier 122 is heated to expand the inner surface and the stator segment 124 is installed thereon. Once the stator carrier 122 cools, the inner surface shrink fits to the stator segment 124. The water jacket 126 is fixed to the stator carrier 122 to enclose a sealed chamber 128 therebetween.

The hybrid module 100 further includes a torque converter 142 including a turbine 144 having a turbine shell 146 and at least one blade attached thereto, and an impeller 148 having an impeller shell 150 and at least one blade attached thereto. The impeller shell 150 is fixed to the rotor carrier 106 at a weld 152, for example. The impeller shell 150 and the rotor carrier 106 define a housing, or enclosure, for the torque converter 142.

The torque converter 142 may include a stator 158 disposed axially between the impeller 148 and the turbine 144 to redirect fluid flowing from the turbine 144 blade before the fluid reaches the impeller 148 to increase an efficiency of the torque converter 142. For example, the impeller 148 blade, when rotated about an axis of rotation AR, pushes the fluid outwardly. The fluid pushes against the turbine 144 of the torque converter 142, causing the turbine 144 to revolve about the axis of rotation AR. The stator 158 functions to return the fluid from the turbine 144 back to the impeller 148 with minimal or no power loss. Drive power is transmitted from the turbine 144 to a transmission input shaft (not numbered).

The torque converter 142 further includes a lockup clutch 154 and a damper 156. The lockup clutch 154 and the damper 156 are disposed within the housing defined by the impeller shell 150 and the rotor carrier 106. The lockup clutch 154 includes a piston 160 and clutch plates 162 for torque transmission between the rotor carrier 106 and the damper 156. The damper 156 may include: springs 164, cover plates 166, 168 connected to each other radially outside springs 164, and an output 170. The cover plate 166 may be connected to at least one of clutch plates 162, and the cover plate 168 may be connected to the turbine shell 146. That is, the cover plates 166, 168 are arranged to act as an input to the damper 156. Torque is transmitted from the damper 156 to the transmission input shaft.

The torque converter 142 further includes an impeller hub 172 connected to an inner end of the impeller shell 150, for example, via welding. The impeller hub 172 extends in an axial direction away from the impeller shell 150. The torque converter 142 further includes a resolver assembly 174 having a resolver rotor 176 and a resolver stator 178. The resolver rotor 176 is fixed to the impeller hub 172. The resolver stator 178 is fixed to the bell housing 120 via a plate 180. For example, a connector 182, e.g., a bolt, fixes the plate 180 to the bell housing 120, and a connector 184, e.g., a river, fixes the resolver stator 178 to the plate 180. The connector 182 is disposed radially outside of the resolver stator 178. The resolver rotor 176 is axially aligned with the resolver stator 178. In other words, a line can be drawn normal to axis of rotation AR that extends through both resolver stator 178 and resolver rotor 176.

The hybrid module 100 further includes a drive plate assembly 130. The drive plate assembly 130 includes an inner drive plate 132 and an outer drive plate 134 fixed to the inner drive plate 132. The inner drive plate 132 is fixed to the rotor carrier 106 at a radial inner end thereof. Specifically, the inner drive plate 132 is fixed to the rotor carrier 106 via a rivet. The inner drive plate 132 is disposed radially inside of an outer surface of the rotor segment 108. The inner drive plate 132 may be fixed to the outer drive plate 134 via a weld 140. In such an example, the weld 140 is arranged radially outside of the rivet and radially inside of the outer surface of the rotor segment 108.

The outer drive plate 134 extends radially outside of the outer surface of the rotor segment 108. The outer drive plate 134 is fixed to a flex plate 138 of a crankshaft (not numbered) of a vehicle engine (not shown) via stud 136. That is, the stud 136 transfers torque from the flex plate 138 to the drive plate assembly 130. The stud 136 may be fixed to the outer drive plate 134, e.g., via a press-fit connection, at a radial outer end thereof.

Figure 2:
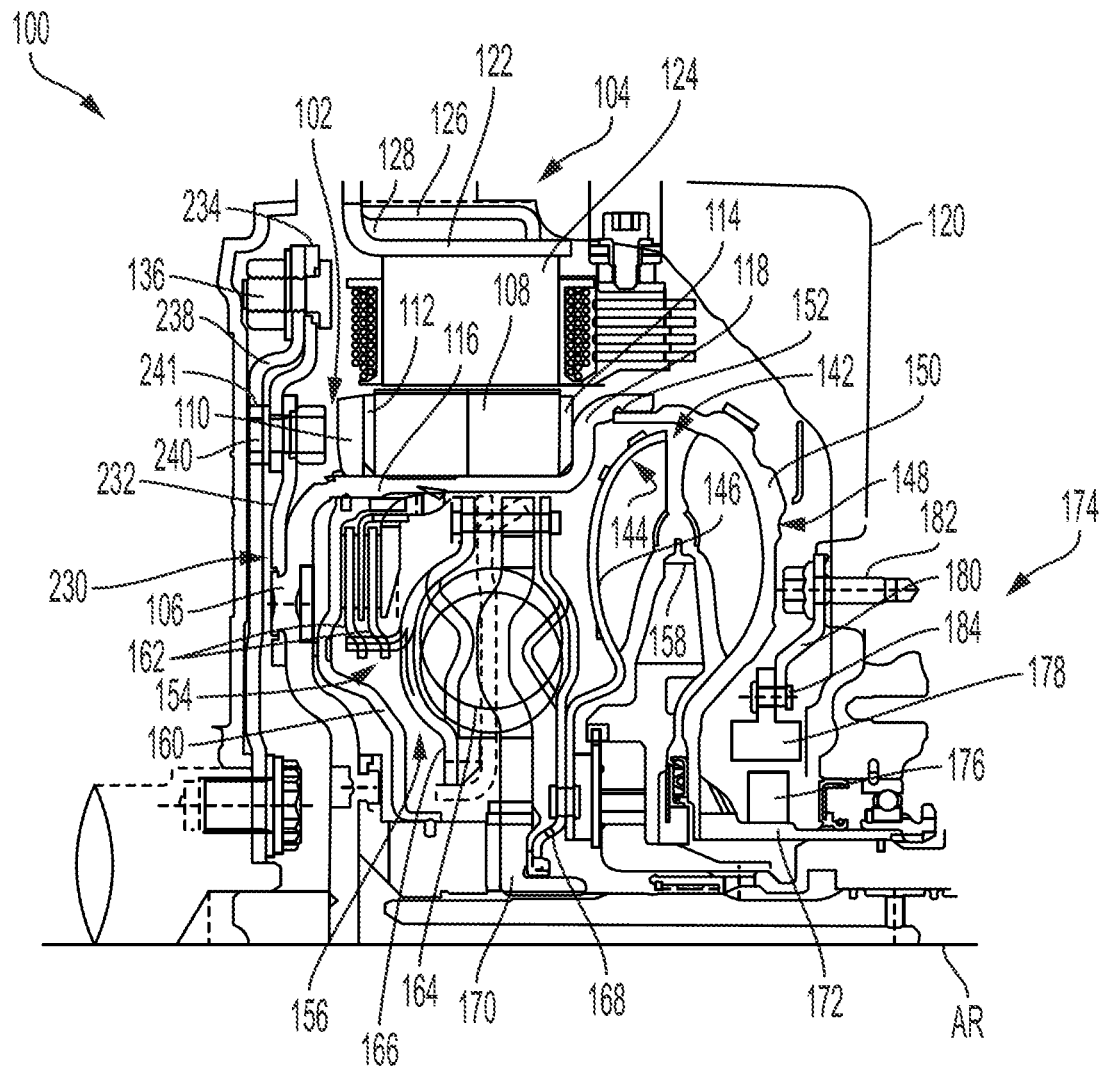
FIG. 2 shows a top half cross-sectional view of a hybrid module including a drive plate assembly according to an alternative embodiment of the present disclosure.

FIG. 2 provides an alternative embodiment a drive plate assembly 230. In contrast to the drive plate assembly 130 shown in FIG. 1 that includes the inner drive plate 132 welded to the outer drive plate 134, drive plate assembly 230 includes the inner drive plate 232 fixed to the outer drive plate 234 via a connector 240, e.g., a bolt. In such an example, the connector 140 is arranged radially outside of the rivet and radially inside of the outer surface of the rotor segment 108. The flex plate 238 may include a window 241 extending axially therethrough. The window 241 of the flex plate 238 may be radially and circumferentially aligned with the connector 240 such that the connector 240 extends into the window 241. Aligning the window 241 with the connector 240 allows for packaging of the drive plate assembly 230 within the envelope of the hybrid module 100. That is, arranging the connector 240 within the window 241 can reduce space required to package the hybrid module 100.

Embodiments disclosed herein provide a drive plate assembly having an inner drive plate and an outer drive plate fixed to the inner drive plate to increase the space available within a typical hybrid module during magnetization of a rotor segment. By having an outer drive plate and the inner drive plate, the outer drive plate can be fixed to the inner drive plate after magnetization of the rotor segment, which increases space within the hybrid module for a magnetization tool to magnetize the rotor segment. Additionally, the inner drive plate can be fixed to a rotor carrier via a rivet prior to assembly of a torque converter, which allows the drive plate assembly to be fixed to the rotor carrier in a manner that prevents fluid leakage through the rotor carrier. In this way, the hybrid module can be assembled such that fluid leakage through the rotor carrier is prevented while achieving desired magnetization of the rotor segment.

Figure 3:
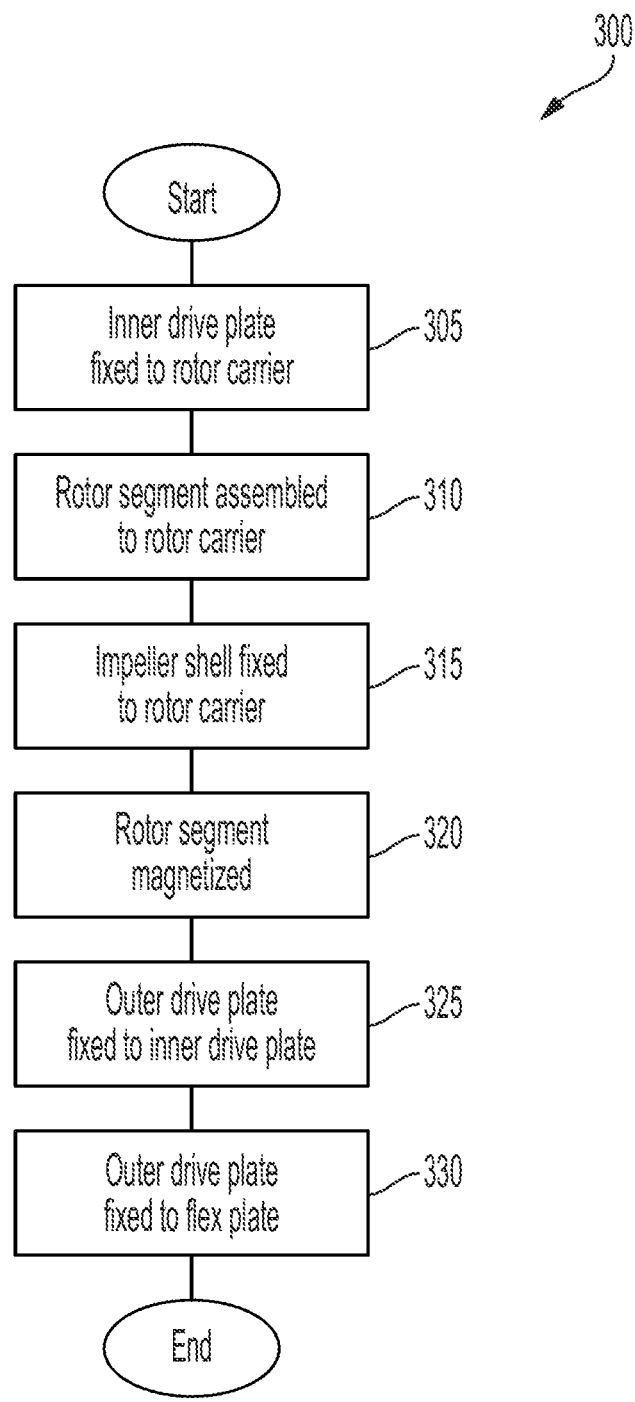
FIG. 3 illustrates a flowchart of an exemplary process for assembling the hybrid module including a drive plate assembly according to the embodiments of the present disclosure.

FIG. 3 is a diagram of an example process 300 for assembling a hybrid module 100 including a drive plate assembly 130, 230 having an inner drive plate 132, 232 and an outer drive plate 134, 234. The process 300 disclosed herein includes exemplary steps executed in an exemplary order. However, it is to be understood that the process 300 may include fewer steps and/or the steps may be executed in a different order.

The process 300 begins in a block 305. In the block 305, the inner drive plate 132, 232 is fixed to a rotor carrier 106, e.g., via a rivet. The process 300 continues in a block 310.

In the block 310, the rotor segment 108 is assembled to the rotor carrier 106. For example, an end ring 110 may be fixed to the rotor carrier 106, e.g., by welding, to compress spring end plates 112, 114 that clamp and/or secure the rotor segment 108 to the rotor carrier 106, as discussed above. The process 300 continues in a block 315.

In the block 315, an impeller shell 150 of a torque converter 142 is fixed to the rotor carrier 106 via a weld 152. Prior to fixing the impeller shell 150 to the rotor carrier 106 other components of the torque converter 142, e.g., a turbine 144, a lockup clutch 154, a damper 156, etc., may be assembled to the impeller shell 150 and/or the rotor carrier 106. The process 300 continues in a block 320.

In the block 320, the rotor segment 108 is magnetized, e.g., according to known rotor magnetization techniques.

For example, a magnetization tool, such as are known, is arranged radially outside of the rotor segment 108. In this situation, the inner drive plate 132, 232 is radially spaced from the magnetization tool, which increases available space for the magnetization tool to be arranged in order to sufficiently magnetize the rotor segment 108, which can assist in achieving desired performance of an e-motor including the rotor segment 108. After magnetizing the rotor segment 108, the magnetization tool is removed. The process 300 continues in a block 325.

In the block 325, the outer drive plate 134, 234 is fixed to the inner drive plate 132, 232. For example, the outer drive plate 134 may be fixed to the inner drive plate 132 via a weld 140, as shown in FIG. 1. As another example, the outer drive plate 234 may be fixed to the inner drive plate 232 via a connector 240, e.g., a bolt, as shown in FIG. 2. The process 300 continues in a block 330.

In the block 330, the outer drive plate 134, 234 is fixed to a flex plate 138, 238 via a stud 136. In the embodiment shown in FIG. 2, the block 330 may further include aligning a window 241 in the flex plate 238 with the connector 240 prior to fixing the flex plate 238 to the outer drive plate 234, as discussed above. The process 300 ends following the block 330.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 hybrid module
102 rotor assembly
104 stator assembly
106 rotor carrier
108 rotor segment
110 end ring
112 spring end plate
114 spring end plate
116 axially extending portion
118 radially extending portion
120 bell housing
122 stator carrier
124 stator segment
126 water jacket
128 sealed chamber 130 drive plate assembly
132 inner drive plate
134 outer drive plate
136 stud
138 flex plate
140 weld
142 torque converter assembly
144 turbine
146 turbine shell
148 impeller
150 impeller shell
152 weld
154 lockup clutch
156 damper
158 stator
160 piston
162 clutch plates
164 springs
166 cover plate
168 cover plate
170 output
172 impeller hub
174 resolver assembly
176 resolver rotor
178 resolver stator
180 plate
182 connector
184 connector
230 drive plate assembly
232 inner drive plate
234 outer drive plate
238 flex plate
240 connector
241 window
AR axis of rotation

What is claimed is:

1. A hybrid module, comprising:
  a rotor carrier;
  a rotor segment supported by the rotor carrier;
  a torque converter including:
    an impeller having an impeller shell fixed to the rotor carrier, the impeller shell and the rotor carrier defining a housing therebetween; and
    a turbine having a turbine shell in fluid communication with the impeller shell, the turbine being disposed within the housing;
  a drive plate assembly disposed external to the housing and including:
    an inner drive plate fixed to an outer surface of a radially extending portion of the rotor carrier; and
    an outer drive plate fixed to the inner drive plate and configured to receive a torque; and
  a stud configured to receive the torque, the stud being supported by the outer drive plate and disposed at a radially outer end thereof, wherein the outer drive plate is fixed to the inner drive plate radially inside of the stud.

2. The hybrid module of claim 1, wherein the outer drive plate extends radially outside of an outer surface of the rotor segment.

3. The hybrid module of claim 1, wherein the inner drive plate is disposed radially inside of an outer surface of the rotor segment.

4. The hybrid module of claim 1, wherein the outer drive plate is fixed to the inner drive plate radially inside of an outer surface of the rotor segment.

5. The hybrid module of claim 1, wherein the outer drive plate is fixed to the inner drive plate via a weld, the weld being located radially inside of an outer surface of the rotor segment.

6. The hybrid module of claim 1, wherein the outer drive plate is fixed to the inner drive plate via a connector, the connector being located radially inside of an outer surface of the rotor segment.

7. The hybrid module of claim 6, further comprising a flex plate, the outer drive plate being disposed axially between the rotor segment and the flex plate and being fixed to the flex plate radially outside of the connector.

8. The hybrid module of claim 7, wherein the flex plate includes a window radially and circumferentially aligned with the connector, the connector extending into the window.

9. The hybrid module of claim 1, wherein the inner drive plate is fixed to the rotor carrier radially inside of the outer drive plate.

10. The hybrid module of claim 1, wherein the inner drive plate is connected to the outer surface of the radially extending portion of the rotor carrier via a rivet.

11. The hybrid module of claim 1, further comprising a lock-up clutch engaged with the rotor carrier and including a clutch plate, wherein the radially extending portion is radially inside of the rotor segment and axially aligned with the clutch plate.

12. The hybrid module of claim 1, wherein the radially extending portion is arranged radially inside of the rotor segment.

13. A method of assembling a drive plate assembly in a hybrid module having a rotor carrier, a rotor segment supported by the rotor carrier, and a torque converter, the method comprising:
  fixing an inner drive plate of the drive plate assembly to an outer surface of a radially extending portion of the rotor carrier;
  attaching the rotor segment to the rotor carrier, wherein the radially extending portion is arranged radially inside of the rotor segment;
  attaching an impeller shell of the torque converter to the rotor carrier;
  after magnetizing the rotor segment, fixing an outer drive plate of the drive plate assembly to the inner drive plate; and
  then fixing the outer drive plate to a flex plate via a stud.

14. The method of claim 13, wherein fixing the outer drive plate to the inner drive plate is carried out via a weld.

15. The method of claim 13, wherein the inner drive plate is disposed radially inside of an outer surface of the rotor segment, wherein the outer drive plate extends radially outside of the outer surface of the rotor segment.

16. The method of claim 13, wherein fixing the outer drive plate to the inner drive plate is carried out via a connector, and the method further comprising:
  aligning a window in the flex plate with the connector.

17. The method of claim 13, wherein the outer drive plate is fixed to the inner drive plate radially inside of an outer surface of the rotor segment.

18. A hybrid module, comprising:
  a rotor carrier;
  a rotor segment supported by the rotor carrier;
  a torque converter including:
    an impeller having an impeller shell fixed to the rotor carrier, the impeller shell and the rotor carrier defining a housing therebetween; and a turbine having a turbine shell in fluid communication with the impeller shell, the turbine being disposed within the housing;

a flex plate; and a drive plate assembly disposed external to the housing and including:

an inner drive plate fixed to the rotor carrier; and an outer drive plate:
configured to receive a torque;
disposed axially between the rotor segment and the flex plate;
fixed to the inner drive plate via a connector; and
fixed to the flex plate radially outside of the connector;

wherein the flex plate includes a window radially and circumferentially aligned with the connector, the connector extending into the window.

* * * * *